(12) United States Patent
Barham

(10) Patent No.: US 9,686,355 B2
(45) Date of Patent: Jun. 20, 2017

(54) THIRD PARTY INITIATION OF COMMUNICATIONS BETWEEN REMOTE PARTIES

(75) Inventor: Paul Barham, San Francisco, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 783 days.

(21) Appl. No.: 12/972,526

(22) Filed: Dec. 20, 2010

(65) Prior Publication Data

US 2012/0159595 A1 Jun. 21, 2012

(51) Int. Cl.
G06F 15/16 (2006.01)
H04L 29/08 (2006.01)
H04L 29/06 (2006.01)

(52) U.S. Cl.
CPC .......... *H04L 67/1095* (2013.01); *H04L 63/08* (2013.01); *H04L 67/06* (2013.01); *H04L 67/2814* (2013.01)

(58) Field of Classification Search
CPC ..... H04L 63/08; H04L 67/06; H04L 67/1095; H04L 67/2814
USPC ........................................................ 709/217
See application file for complete search history.

(56) References Cited

U.S. PATENT DOCUMENTS

| | | | | |
|---|---|---|---|---|
| 6,003,074 | A * | 12/1999 | Vasconcellos | 709/220 |
| 7,440,560 | B1 * | 10/2008 | Barry | 379/201.01 |
| 8,447,866 | B2 * | 5/2013 | Johansson | 709/227 |
| 2005/0018619 | A1 * | 1/2005 | Banks et al. | 370/254 |
| 2006/0184652 | A1 | 8/2006 | Teodosiu et al. | |
| 2006/0259573 | A1 * | 11/2006 | Goodman et al. | 709/217 |
| 2007/0041383 | A1 * | 2/2007 | Banikazemi et al. | 370/395.3 |
| 2007/0055743 | A1 * | 3/2007 | Pirtle et al. | 709/217 |
| 2007/0171907 | A1 * | 7/2007 | Mansutti et al. | 370/389 |

(Continued)

FOREIGN PATENT DOCUMENTS

| | | |
|---|---|---|
| CN | 1528079 A | 9/2004 |
| CN | 101449543 A | 6/2009 |

(Continued)

OTHER PUBLICATIONS

"International Search Report", Mailed Date: Aug. 22, 2012, Application No. PCT/US2011/065708, Filed Date: Dec. 19, 2011, pp. 9.

(Continued)

*Primary Examiner* — Shean Tokuta
(74) *Attorney, Agent, or Firm* — Aneesh Mehta; Kate Drakos; Micky Minhas

(57) ABSTRACT

A data transfer system is described herein that allows data to be sent directly between two computing devices at the request of a third party client computer. The system allows a third party to initiate data transfers between computers in a network file system. This results in a significant speed increase because little to no data travels over the third party's potentially slower connection. The data transfer system provides a mechanism to determine if the direct transfer would be more efficient than two separate read and write operations, based on measurements of bandwidth and latency between each computing device. The data transfer system provides support for the source server to compress the data and the destination server to decompress the data at the direction of a third party client to further save network bandwidth.

19 Claims, 4 Drawing Sheets

(56) References Cited

U.S. PATENT DOCUMENTS

| | | | |
|---|---|---|---|
| 2008/0097998 A1* | 4/2008 | Herbach | 707/9 |
| 2008/0152263 A1 | 6/2008 | Harrison | |
| 2009/0080395 A1* | 3/2009 | Takenaka | H04W 76/023 370/338 |
| 2011/0041002 A1* | 2/2011 | Saavedra | 714/4 |
| 2012/0066543 A1* | 3/2012 | Pafumi et al. | 714/4.11 |
| 2012/0158947 A1* | 6/2012 | Hassan et al. | 709/224 |

FOREIGN PATENT DOCUMENTS

| | | |
|---|---|---|
| JP | H0583259 A | 4/1993 |
| JP | H11154065 A | 6/1999 |
| JP | 2000215163 A | 8/2000 |
| JP | 2002163235 A | 6/2002 |
| JP | 2003108519 A | 4/2003 |
| JP | 2003110578 A | 4/2003 |
| JP | 2004005189 A | 1/2004 |
| JP | 2009038717 A | 2/2009 |

OTHER PUBLICATIONS

"FXP—FTP transfers from server to server", Retrieved at <<http://geekswithblogs.net/Lance/archive/2008/05/15/fxp---ftp-transfers-from-server-to-server.aspx >>, May 15, 2008, pp. 2.

Hamid, Saad, "How to Do a Server to Server File Transfer?", Retrieved at << http://www.sizlopedia.com/2007/04/03/how-to-do-a-server-to-server-file-transfer/ >>, Apr. 3, 2007, pp. 14.

"Gene 6 FTP Server", Retrieved at << http://www.g6ftpserver.com/en/mode >>, Oct. 1, 2010, p. 1.

Cherkasova, et al., "FastReplica: Efficient Large File Distribution within Content Delivery Networks", Retrieved at << http://www.hpl.hp.com/techreports/2003/HPL-2003-43.pdf >>, Proceedings of the 4th conference on USENIX Symposium on Internet Technologies and Systems, vol. 4, Feb. 27, 2003, pp. 15.

"Server-to-Server FTP Transfer (IIS 6.0)", Retrieved at << May 4, 2006 http://www.microsoft.com/technet/prodtechnol/WindowsServer2003/Library/IIS/38b012c0-442a-491c-aafc-c174b0048546.mspx?mfr=true >>, Retrieved Date: Oct. 1, 2010, pp. 2.

"PKZIP Server for Windows", Retrieved at << http://pkzip-server-for-windows.software.informer.com/ >>, Retrieved Date: Oct. 1, 2010, pp. 2.

"Slow Network File Copy issues in Windows 7 caused by Remote Differential Compression", Retrieved at << http://www.windowsreference.com/windows-7/slow-network-file-copy-issues-in-windows-7-caused-by-remote-differential-compression/ >>, Retrieved Date: Oct. 1, 2010, pp. 10.

State Intellectual Property Office of the People's Republic of China, First Office Action and Search Report Issued in Chinese Patent Application No. 201110427793.1, Mar. 7, 2014, 12 Pages.

Japanese Patent Office, Office Action Issued in Japanese Patent Application No. 2013-546269, Nov. 11, 2015, 6 Pages.

Taiwan Intellectual Property Office, Office Action Issued in Taiwan Patent Application No. 100140758, Nov. 23, 2015, 8 Pages. (Submitted with Translation of Search Report).

* cited by examiner

THIRD PARTY INITIATION OF COMMUNICATIONS BETWEEN REMOTE PARTIES

BACKGROUND

It is increasingly common for households to own more than one computer, and for these machines to be on a home network. Most homes have multiple computers in the form of desktops, laptops, home theater PCs (HTPCs), as well as non-traditional computing devices that contain common computing hardware such as game consoles, mobile phones, and embedded devices (e.g., set top boxes, routers, and other equipment). Home networks may include more than one connection type, such as wired Ethernet connections to some devices and wireless Wi-Fi connections to other devices. Some devices also communicate using other technologies such as a USB connection or Bluetooth. Other environments may include similar characteristics, such as a small office.

Users often work with multiple devices to perform particular tasks. These tasks often involve moving large amounts of data from one device to another. For example, a user may record television programs on a home theater PC, transfer the programs to a home server where they are transcoded to one or more smaller formats, and then copy the transcoded files to a mobile device for viewing the television programs on the go. Users also perform backups that involve copying large amounts of data from one computing device to a backup computing device, such as a home server or network attached storage (NAS) device.

When accessing files and data stored on a server computer, a client machine uses a network file system protocol such as network file system (NFS) or Server Message Block (SMB/CIFS) which provide operations to read, write, and enumerate files. A client computer frequently interacts with more than one file server. If the client wishes to move or copy files from one server to another it is normal for the client to read files from one server into its local memory, and then write the file contents to the second server. Thus, the data traverses the network twice. If the network exhibits low bandwidth (wireless/modem) or high latency (satellite/WAN) then this process is both slow and inefficient. There may frequently exist a more direct fast path between the two servers but current operating systems and file systems provide no way to use it.

SUMMARY

A data transfer system is described herein that allows data to be sent directly between two computing devices at the request of a third party client computer. The system allows a third party to initiate data transfers between computers in a network file system. This results in a significant speed increase because little to no data travels over the third party's potentially slower connection. The data transfer system provides a mechanism to determine if the direct transfer would be more efficient than two separate read and write operations, based on measurements of bandwidth and latency between each computing device. Alternatively or additionally, each computing device can engage in a brief benchmarking process to compile statistics about the various connections. The data transfer system provides support for the source server to compress the data and the destination server to decompress the data at the direction of a third party client to further save network bandwidth. The data transfer system extends traditional file system protocols to support an operation that allows a client C to request that server A read data from file Fa stored on server A and send a write operation directly to server B to transfer the data to file Fb. Thus, the data transfer system reduces data transfers over inefficient networks between third party computers when a faster network connection is available directly between the third party computers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
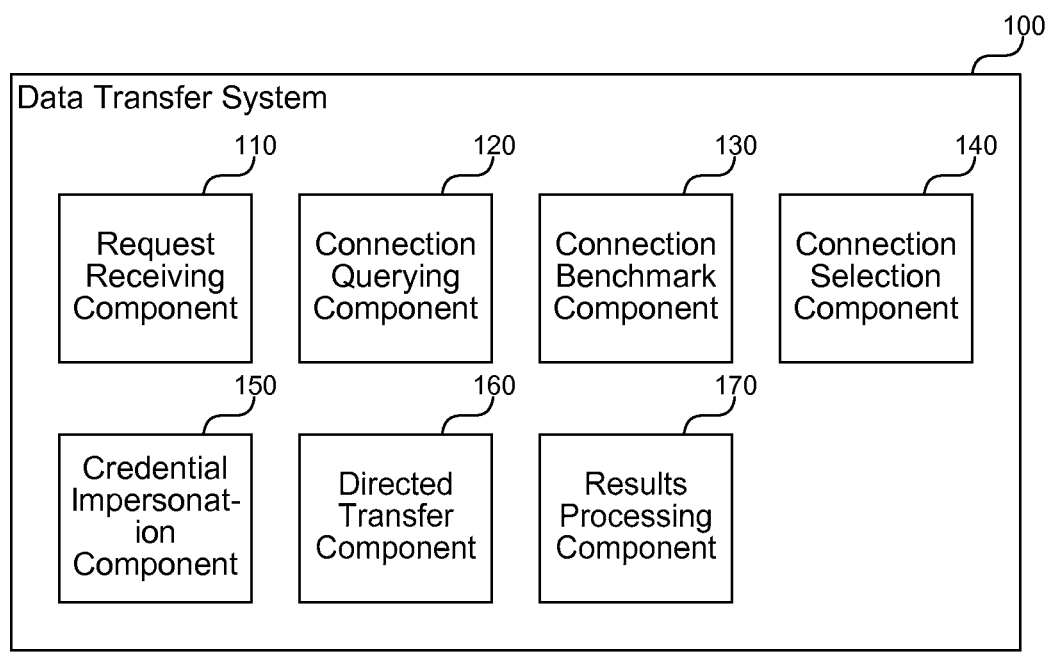
FIG. 1 is a block diagram that illustrates components of the data transfer system, in one embodiment.

A data transfer system is described herein that allows data to be sent directly between two computing devices at the request of a third party client computer. The system allows a third party to initiate data transfers between computers in a network file system. For example, if a user on a laptop connected to a home network via a slow Wi-Fi connection requests that a large file be transferred from server A to server B, and servers A and B are connected by a fast network connection, then the laptop can request that server A directly transfer data to server B, without routing the data to the laptop first. This results in a significant speed increase because little to no data travels over the laptop's slow connection. The data transfer system provides a mechanism to determine if the direct transfer would be more efficient than two separate read and write operations, based on measurements of bandwidth and latency between each computing device. For example, the operating systems of the laptop and two servers in the previous example may maintain statistics about the speed of transfers between each system. Alternatively or additionally, each computing device can engage in a brief benchmarking process to compile statistics about the various connections.

In some embodiments, the data transfer system provides support for server A to compress the data and for server B to decompress the data to further save network bandwidth. This may result in a faster transfer if the network is slower than the latency overhead introduced by the compression and decompression at each end of the communication. The system can also use differential compression to send just the parts of the data that Server B does not already have. For example, if A and B frequently exchange a file that is updated, many parts of the file may already be available at B, so that A need not resend them. The data transfer system uses a similar mechanism to perform efficient replication, such as writing identical data to more than one file server.

The data transfer system extends traditional file system protocols to support an operation that allows a client C to request that server A read data from file Fa stored on server A and send a write operation directly to server B to transfer the data to file Fb. Existing protocols use messages exemplified by the following pseudo code for this type of transfer.

C to A ReadRequest(FileA, offset 100)
A to C ReadReponse(Data)
C to B WriteRequest(FileB, offset 200, Data)
B to C WriteResponse(OK)

Using the data transfer system, the conversation changes as shown in the following pseudo code.

C to A ReadWriteRequest(FileA, offset 100, ServerB, FileB, offset 200)
A to B WriteRequest(FileB, offset 200, Data)
B to C ReadWriteResponse(OK)

There are many alternatives to this conversation, e.g. where A sends a Read response to C and B sends a write response to C. Alternatively, B's response could be sent to A who forwards it to C. Another alternative is the case where the data is copied in the opposite direction. i.e., C asks A to read data from B and write it at A.

Client C can negotiate in advance with A and B to determine the various network performance characteristics and to create a session/connection between A and C whereby B trusts A to perform operations acting as C. This enables some parameters to be omitted from the above messages. C, A, and B use well-known techniques (e.g., "packet-pair", ping, and tracert) to determine the bandwidth and latency of the three network paths and determine whether a direct transfer between A and C would result in a performance improvement. Alternatively, MICROSOFT™ Link Layer Topology Discovery (LLTD) mechanism allows networked devices to build a map of the home network and determine the bottleneck bandwidth of each link. At the expense of some additional central processing unit (CPU) time, the system can compress the data at A and decompress at B, resulting in less data being sent over the network but slightly higher latency. Thus, the data transfer system reduces data transfers over inefficient networks between third party computers when a faster network connection is available directly between the third party computers.

Two other considerations faced by the data transfer systems relate to asymmetric connections and security credentials. An asymmetric connection refers to the situation that can occur in modern networking where computer A can communicate with computer B, and computer B can communicate with computer C, but computer A cannot communicate with computer C. This can occur, for example, when computers B and C are behind a Network Address Translator (NAT) while computer A is connected to a public Internet connection. In some cases, computer B may be a MICROSOFT™ WINDOWS™ Home Server or other computer dedicated for external access outside of the home. Computer B may be placed in a demilitarized zone (DMZ) by a router or may be able to directly receive external network connections while computer C cannot. In such situations, computer A connecting from outside the home may not be able to copy files between computers B and C at all in traditional systems (because A can access B directly but not C). Using the data transfer system, however, such transfers are possible after computer B determines that a connection is available from it directly to computer C (because both are connected within the same home network behind the firewall).

The second consideration is security credentials. When computer A transfers files to computer C, computer C checks computer A or a user using computer A's credentials, verifies that the requested operation is permitted, and then performs the operation. When computer A directs computer B to transfer a file or other resource to computer C using the data transfer system described herein, computer B ensures that credentials are used for the transfer to computer C that are the same as computer A or that at least have similar rights. Otherwise, computer A would be able to circumvent normal security restrictions. In some embodiments, computer A identifies a security principal to computer B for performing the transfer, authenticates that security principal to the satisfaction of computer B, and then computer B impersonates the security principal for the transfer to computer C. By doing this, computer C can perform the same authorization checking it performed traditionally, and computer B will be able to perform only those operations at computer A's request that computer A could have performed on its own. This is frequently known as impersonation in a MICROSOFT™ WINDOWS™ setting. Other implementations may be possible in an environment where the security mechanisms allow delegation of privileges, or where access control is bases on capabilities.

FIG. 1 is a block diagram that illustrates components of the data transfer system, in one embodiment. The system 100 includes a request receiving component 110, a connection querying component 120, a connection benchmark component 130, a connection selection component 140, a credential impersonation component 150, a directed transfer component 160, and a results processing component 170. Each of these components is described in further detail herein.

The request receiving component 110 receives from a directing client a request at a source server that contains data to be transferred to a destination server. The request may include parameters identifying the data (e.g., a file path or other identifier), a portion of the data to be transferred (e.g., a file offset, data size, or other specification of part or all of the data), a set of security credentials associated with the directing client or a user of the directing client, and so forth. The directing client receives a request from an application running on the client to transfer data from the source server to the destination server.

There are many ways for the system to determine whether and when to use directed transfers. In some embodiments, the client sends a request to the source server to determine whether the source server supports a directed transfer that would allow the source server to send the data directly to the destination server on the directing client's behalf, without first sending the data to the directing client. If the source server supports the directed request (and the source server's connection to the destination server is faster than the client's connection to both the source and destination servers), then the client directs the source server to complete the transfer directly to the destination server. The decision to use this mechanism can be made once at the start, and then checked periodically, or upon any of the machines noticing a change in network conditions. The decision may not be made by talking to server A or B, sometimes (e.g., with the LLTD protocol) all machines on the network are capable of determining and analyzing the network topology and bandwidth.

The connection querying component 120 queries one or more networks to identify computing devices and determines which computing devices can reach each other over which networks. In a home environment, for example, there may exist wired and wireless networks that can be identified from the directing client by broadcasting data over each network or by connecting to a router that provides Internet Protocol (IP) addresses to each computing device on the network using Dynamic Host Configuration Protocol (DHCP). LLTD and/or the BAND protocol may also be used to discover network information. After identifying the computing devices and the ways they are connected, the system can continue by gathering statistics about each potential connection.

The connection benchmark component 130 performs one or more tests on one or more possible connections between computing devices to determine one or more data transfer capabilities of the connections. For example, the system may execute a ping test, packet-pair test, or other test designed to determine each connection's bandwidth, latency, buffer capacity, and other network parameters that affect data transfer rates. The system may install an agent (such as an LLTD responder) on each computing device or each device may have a modified operating system that allows the system to direct each computing device to perform the benchmarking tests from that device to another device. Upon completion, the system can build a connection preference table that sorts the available connections by their data transfer capabilities.

The connection selection component 140 selects a connection from among the one or more possible connections that will allow the requested transfer to complete in accordance with one or more performance criteria. Typically, the performance criterion seeks to complete the transfer in the least amount of time. However, other considerations may lead to other performance criteria, such as using a slower, idle connection to complete the transfer without consuming more valuable high-speed bandwidth, completing the transfer over a connection type that uses less battery power, completing the transfer during an idle period of the day, and so forth. The connection selection component 140 chooses the connection that will make the transfer and informs the directing client so that the client can request the selected connection. In some cases, the system maintains a connection preference table determined in advance and the system consults the table at the time of a transfer to select the fastest connection between an identified set of servers.

The credential impersonation component 150 creates credentials for the source server that impersonate those of the directing client. The directing client may provide a set of credentials or the source server may automatically determine them. In some cases, the source server may request additional information, such as a password, from the directing client so that that source server can transfer data to the destination server on the client's behalf using the correct set of credentials. This prevents a directing client from completing actions the directing client is not authorized to perform even if the source server would be authorized to perform those actions.

The directed transfer component 160 sends a request from the directing client to the source server to send data directly from the source server to the destination server without sending the data to the directing client first. If the servers are connected by a fast network and the client is connected to the servers by a slow network, the directed transfer will generally complete much faster than a traditional transfer to the client first will. The directed transfer component 160 may include modifications to the source server's network-related software to allow directed transfers, such as revisions to the SMB and/or NFS layers to allow a third party to direct a transfer from the source server to other servers. In some embodiments, the directed transfer component 160 requests data compression or other space saving techniques for further increasing the data transfer performance.

Although identified as clients and servers herein, those of ordinary skill in the art will recognize that any computing device can act at times like a client and at other times like a server, and these designations are not indicative of any particular capabilities or lack of capabilities of each computing device.

The results processing component 170 manages returning a result of the transfer to the directing client. Previously, the directing client would be performing each action and would receive the result of the transfers directly from each server. Using the data transfer system 100, the directing client is largely out of the conversation after the initial request to transfer data (though the system may provide progress messages), and thus will not be the first recipient of the transfer result. For example, if anything goes wrong or if the transfer completes successfully, the destination server will inform the source server, but it is up to the source server to convey that information do the directing client. Thus, the source server may track state information about each transfer that identifies on whose behalf the source server was performing the transfer so that the source server can provide the result of the transfer to the directing client. The source server and/or directing client may include logic for retrying or other handling for failures.

The computing device on which the data transfer system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
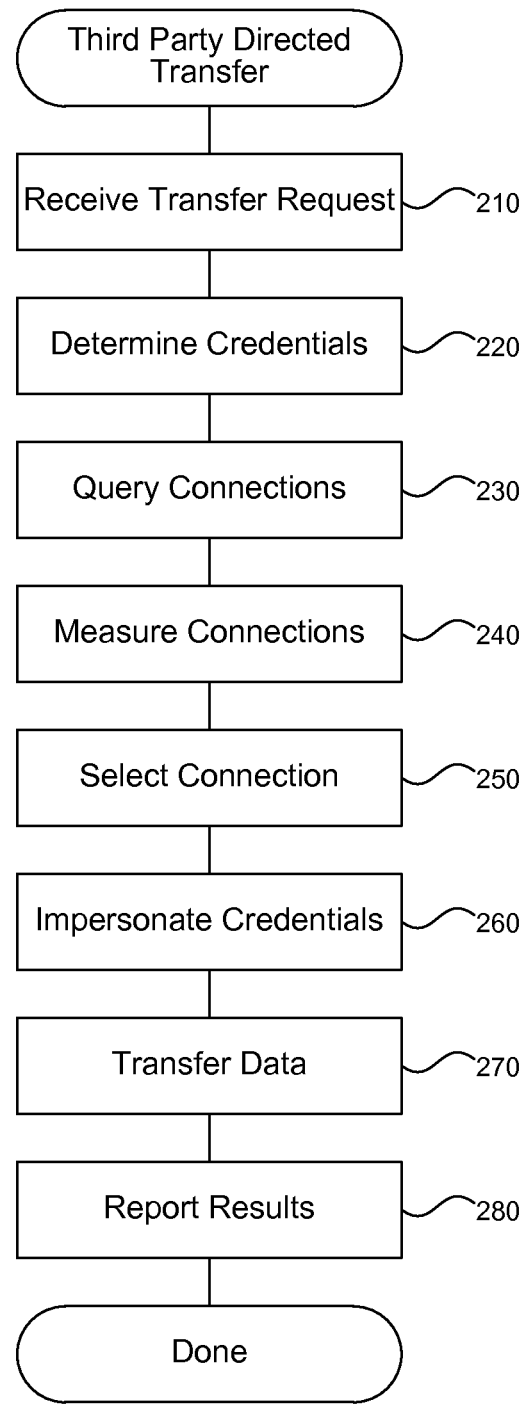
FIG. 2 is a flow diagram that illustrates processing of the data transfer system to transfer a file between two computing devices at the direction of a third computing device, in one embodiment.

FIG. 2 is a flow diagram that illustrates processing of the data transfer system to transfer a file between two computing devices at the direction of a third computing device, in one embodiment. Beginning in block 210, the system receives a transfer request from a directing client that requests a direct transfer of data between a source server and a destination server. For example, the client may be connected via Wi-Fi to a home network, and may send the request to inquire whether the source server has a better connection to the destination server than the client that would allow the transfer to complete faster. The transfer may identify data, such as a file, that is the subject of the transfer. The request can originate in a variety of ways. For example, a user at the directing client may use a shell program (e.g., MICROSOFT™ WINDOWS™ Explorer) to view files on the source server. The user may use a copy and paste operation to request that one or more files from the source server be copied to the destination server.

Continuing in block 220, the system determines security credentials associated with the transfer request on whose behalf the transfer will occur. If the source server ends up performing the transfer directly, the source server uses the security credentials to act on behalf of the directing client. The source server may query the directing client for the security credentials or receive the credentials as part of the transfer request.

Continuing in block 230, the system queries one or more networks to identify connections between the directing client, source server, and destination server. The system may query by looking up DNS cache information at the source server, querying a router or other source of network information, or broadcasting to identify other network devices. The source server may also directly ping the directing client and the destination server on various networks (e.g., a Wi-Fi network and a wired network) to determine how the source server can reach the other computing devices.

Continuing in block 240, the system measures the identified connections to rank the connections based on network performance. For example, the system may determine that a wired network has higher throughput than a wireless network, or that two computers with gigabit network interface cards (NICs) are faster on a wired network than two computers where one has a 100-megabit NIC. The system measures connections using a variety of techniques well known in the art, such as a ping test or other speed test that measures bandwidth, latency, and other network parameters.

Continuing in block 250, the system selects a connection over which to perform the transfer based on the measured network performance of each connection. For example, if the system determines that the source server has a higher throughput connection to the destination server than the directing client does, then the system will select the source server to perform the transfer directly. In some cases, the client may have a better connection to the destination server or the source server may not have a connection to the destination server at all, in which case the directing client will perform the transfer in the traditional manner, by first transferring data to the client then to the destination server.

Continuing in block 260, the system impersonates the determined security credentials so that the transfer can occur from the source server using credentials similar to those if the directing client was performing the transfer. Impersonating credentials is commonly performed on a single computing device but can be extended to work over the network. In the case of a home network, each computing device may use a similar set of user accounts and passwords, such that one computing device can impersonate another simply by knowing which user account to use. In other cases, the system may transfer authentication information from one computing device to another to allow impersonation or may use a Kerberos or other authentication server to provide verification that the request originates from the directing client.

Continuing in block 270, the system transfers data directly from the source server to the destination server on behalf of the directing client, without first transferring the data to the directing client. Transferring the data directly speeds up the transfer and avoids the redundant step of first transferring the data to the client. More importantly, the transfer avoids the client's potentially slow network connection by completing the transfer over the fast network connection between the two servers.

Continuing in block 280, the system reports the result of the transfer to the directing client. The source server transfers the data to the destination server and thus receives information about the progress of the transfer as well as the final result of the transfer. The source server provides this information to the directing client so that the client can either confirm successful completion of the transfer or handle any errors in a manner the directing client determines. After block 280, these steps conclude.

Figure 3:
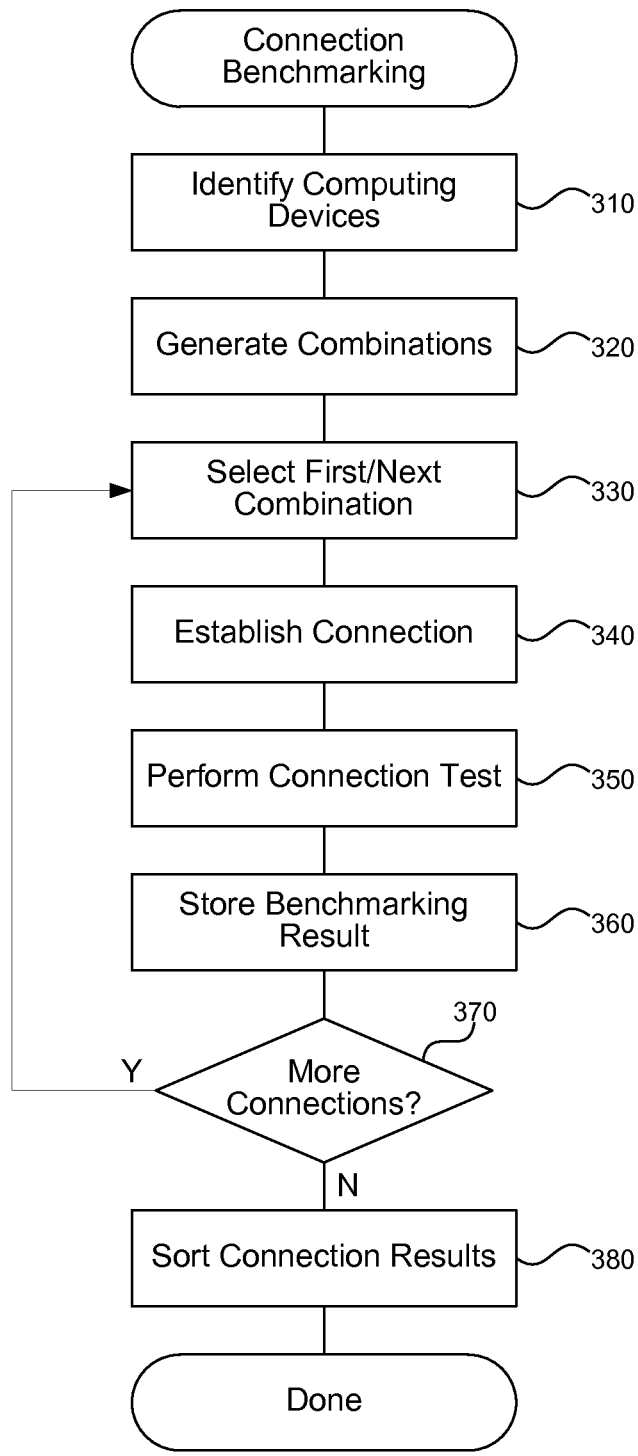
FIG. 3 is a flow diagram that illustrates processing of the data transfer system to gather connection benchmarking information to build a connection preference table to select connections for transferring data, in one embodiment.

FIG. 3 is a flow diagram that illustrates processing of the data transfer system to gather connection benchmarking information to build a connection preference table to select connections for transferring data, in one embodiment. Beginning in block 310, the system identifies one or more computing devices attached by one or more networks. The networks may include networks within a home or small office that connect computer system via Ethernet, Wi-Fi, or other networking technologies. Devices may also be connected by public networks such as a phone that can access a home network through a 3G or other cellular data connection. The system can identify computing devices by broadcasting a request, querying a source of network information (e.g., a router or DNS server), and so on.

Continuing in block 320, the system generates one or more combinations of connections between the identified computing devices. For example, the system may determine each permutation of the available computing devices and determine whether a connection can be made by pinging the destination computing device over the selected network. Some devices may be connected by multiple networks (e.g., redundant NICs, wired and Wi-Fi, and so forth), and each network represents a separate combination of connection.

Continuing in block 330, the system selects the first generated combination. On subsequent iterations, the system selects the next combination. Although shown serially for ease of illustration, those of ordinary skill in the art will recognize that the system can test multiple connection combinations in parallel to speed up the benchmarking process. Continuing in block 340, the system establishes a connection based on a source computing device and target computing device identified by the selected combination. The connection may include a transmission control protocol (TCP) or other connection for transferring test data to measure the connection's performance.

Continuing in block 350, the system performs a connection test by sending one or more measuring data transfers to assess the selected connection's network capabilities. The capabilities measured may include bandwidth, latency, buffer sizes, support for features (e.g., header compression, selective acknowledgements, and so on), and the like. Continuing in block 360, the system stores the benchmarking result in a connection preference table accessible for determining a connection to select for performing a transfer between any two of the identified computing devices, regardless of the computing device that initiates the transfer. Continuing in decision block 370, if there are more combinations, then the system loops to block 330 to select the next combination.

Continuing in block 380, the system sorts the stored connection preference table to give preference to connections with faster network capabilities. For example, the system may sort the table by bandwidth or a score determined as a function of bandwidth and other network parameters. Each computing device can cache the network preference table to use when a transfer occurs to determine the fastest connection to select for the transfer. After block 380, these steps conclude.

Figure 4:
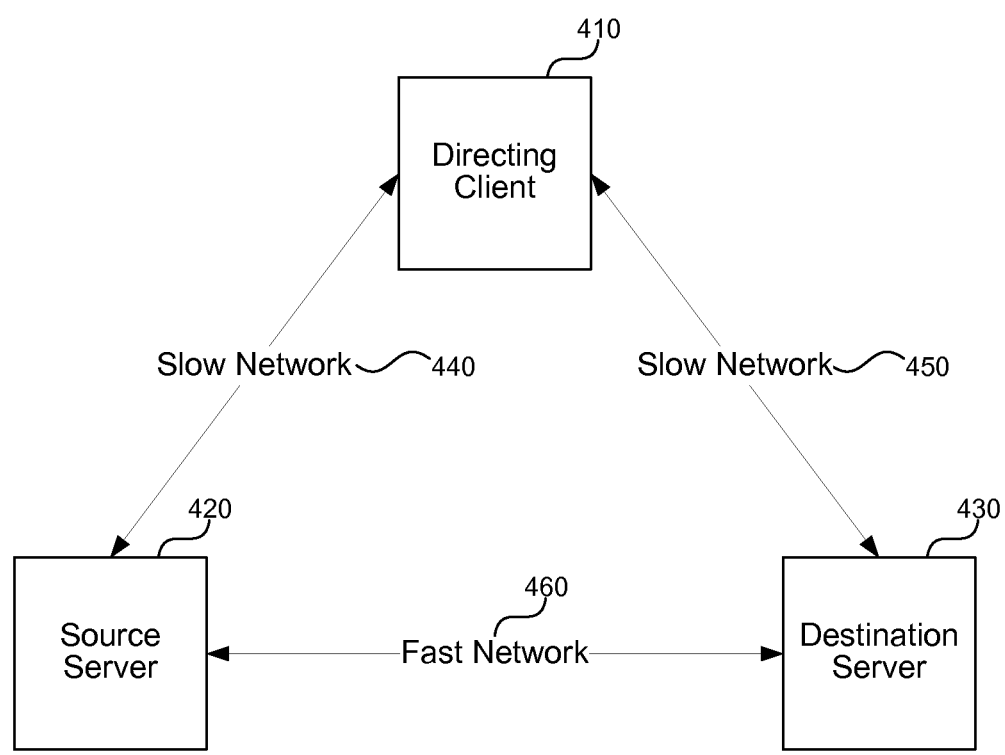
FIG. 4 is a block diagram that illustrates an exemplary operating environment of the data transfer system, in one embodiment.

FIG. 4 is a block diagram that illustrates an exemplary operating environment of the data transfer system, in one embodiment. The diagram includes a directing client 410, a source server 420, and a destination server 430. A user at the directing client 410 may perform a variety of actions, including requesting a transfer of files from the source server 420 to the destination server 430. This is a common operation in a variety of network settings, including a home, small office, or even a datacenter. Unfortunately, the directing client 410 is connected to the source server 420 via a slow network 440. The network 440 may be a wireless connection, a virtual private network (VPN) connection over the Internet, or some other type of relatively slow connection.

Today, file transfer communications occur between two parties, and the client is forced to transfer data first from the source server 420 to the directing client 410 and then from the directing client 410 to the destination server 430. Unfortunately, the directing client 410 is also connected to the destination server 430 via a slow network 450 so the overall speed of the data transfer will be very slow and the transfer will take a long time to complete. Using the data transfer system described herein, the directing client 410 can instruct the source server 420 to directly transfer data to the destination server 430 using the fast network 460 between them. This will greatly speed up the transfer and may even allow the client to disconnect or do other things while the transfer completes.

In some embodiments, the data transfer system allows the directing client to initiate a data transfer and completes the data transfer without further intervention from the client. The client may disconnect from the network and perform other tasks (e.g., disconnecting a laptop as a result of leaving home where the laptop was connected to a local home Wi-Fi network). The client can return later and request the result of the transfer from the source server, or directly inspect whether the files or other data are present on the destination server. This allows the client to direct a number of operations without being tied up waiting for the operations to complete.

In some embodiments, the data transfer system allows the client to request or the source server to determine that data compression be used for the transfer. Data compression can be helpful to speed up file transfers in cases where data includes redundant information that compresses well to produce a smaller size of data to transfer over the network. Data compression is also helpful where a directory or other source of many small data items is being transferred over the network. Normally each file is transferred individually which involves overhead for setting up and performing each transfer. By compressing the data, the system can produce one file or data item that can be transferred in one operation. The destination server then decompresses the compressed data to complete the transfer. Compressing an entire directory into a ZIP or TAR file also avoids many synchronous directory operations to enumerate files at the source and recreate them at the destination.

In some embodiments, the data transfer system sends a request from the destination server to the directing client to verify the credentials of the directing client. The destination server may not trust the source server sufficiently to allow the source server to act on the directing client's behalf. Thus, the destination server can connect to the directing client during a setup phase of the transfer to ensure that the directing client authorized the transfer or to obtain security credentials directly from the directing client. Although the bulk of the data flows directly between the source server and the destination server, the directing client can still be reached in many cases for small data queries such as this one to setup the operation without a noticeable impact on performance.

From the foregoing, it will be appreciated that specific embodiments of the data transfer system have been described herein for purposes of illustration, but that various modifications may be made without deviating from the spirit and scope of the invention. Accordingly, the invention is not limited except as by the appended claims.

I claim:

1. A computer-implemented method for transferring data between two computing devices at the direction of a third computing device, the method comprising:
    receiving a transfer request from a directing client that requests a direct transfer of the data between a source server and a destination server;
    querying one or more networks to identify connections between the directing client, the source server, and the destination server, wherein the connections include at least a connection between the directing client and the source server, a connection between the directing client and the destination server and a connection between the source server and the destination server;
    measuring the identified connections to rank the connections based on network performance;
    selecting a connection over which to perform the transfer based at least in part on the measured network performance of each connection;
    revising layers of a network file system protocol of the source server to allow the directing client to request the direct transfer of the data to the destination server;
    transferring data directly from the source server to the destination server on behalf of the directing client, without first transferring the data to the directing client when the connection between the source server and the destination server is ranked higher than the connection between the directing client and the source server and the directing client and the destination server; and
    reporting the result of the transfer to the directing client, wherein the preceding steps are performed by at least one processor.

2. The method of claim 1 wherein receiving the transfer request comprises determining whether the source server has a better connection to the destination server than the client that would allow the transfer to complete faster.

3. The method of claim 1 further comprising: determining security credentials associated with the transfer request on whose behalf the transfer will occur, and impersonating the determined security credentials so that the transfer can occur from the source server using credentials similar to those if the directing client was performing the transfer, wherein determining security credentials comprises querying the directing client for the security credentials.

4. The method of claim 1 wherein querying one or more networks comprises querying a router or other source of network information to identify computing devices attached to the networks.

5. The method of claim 1 wherein measuring the identified connections comprises determining the bandwidth and latency of each connection.

6. The method of claim 1 wherein selecting the connection comprises, upon determining that the source server has a higher throughput connection to the destination server than the directing client does, selecting the source server to perform the transfer directly.

7. The method of claim 3 wherein impersonating security credentials comprises transferring authentication information from the directing client to the source server.

8. The method of claim 3 wherein impersonating security credentials comprises transferring authentication information from the directing client to the destination server.

9. The method of claim 1 wherein transferring data comprises avoiding the client's slower network connection by completing the transfer over a faster network connection between the two servers.

10. The method of claim 1 wherein reporting the result comprises receiving at the directing client information specifying progress of the transfer from the source server.

11. A computer system for performing third party initiation of communications between remote parties, the system comprising:
  a processor and memory configured to execute software instructions embodied within the following components;
  a request receiving component configured to receive from a directing client a request at a source server that contains data to be transferred to a destination server;
  a connection querying component configured to query one or more networks to identify computing devices and determine which computing devices can reach each other over each network;
  a connection selection component configured to select a connection from among the one or more possible connections that will allow the requested transfer to complete in accordance with one or more performance criteria;
  a directed transfer component configured to revise layers of a network file system protocol of the source server to allow the directing client to request direct transfer of the data to the destination server, and configured to send a request from the directing client to the source server to send the data directly from the source server to the destination server without sending the data to the directing client first when a connection between the source server and the destination server is determined to have a higher performance than a connection between the source server and the directing client and a connection between the directing client and the destination server; and
  a results processing component that manages returning a result of the transfer to the directing client.

12. The system of claim 11 wherein the request receiving component receives parameters with the request that include at least one of an identifier of the data to be transferred, a portion of the data to be transferred, and a set of security credentials associated with the directing client.

13. The system of claim 11 further comprising a connection benchmark component configured to perform one or more tests on one or more possible connections between computing devices to determine one or more data transfer capabilities of the connections, wherein the connection benchmark component performs tests to determine each connection's bandwidth and latency.

14. The system of claim 11 further comprising a credential impersonation component configured to create credentials for the source server that impersonate those of the directing client.

15. The system of claim 11 wherein the connection selection component selects a connection that will complete the transfer in the least amount of time based on measured network parameters.

16. The system of claim 11 wherein the connection selection component consults a previously created connection preference table to select the fastest connection between an identified set of servers.

17. The system of claim 11 wherein the directed transfer component is further configured to specify whether the transfer will use data compression to compress data from the source server.

18. A computer-implemented method performed by at least one processor at a directing client computing device, the method comprising:
  causing revisions of layers of a network file system protocol of a source server computing device to allow the directing client to request a direct transfer of data between the source server computing device and a destination server computing device without first transferring the data to the directing client computing device;
  sending a transfer request to the source server computing device that requests the direct transfer of the data between the source server computing device and the destination server computing device;
  querying one or more networks to identify connections between the directing client computing device, the source server computing device, and the destination server computing device, wherein the connections include at least a connection between the directing client computing device and the source server computing device, a connection between the directing client computing device and the destination server computing device and a connection between the source server computing device and the destination server computing device;
  measuring the identified connections to rank the connections based on network performance;
  selecting a connection over which to perform the transfer based at least in part on the measured network performance of each connection;
  causing the transfer of the data directly from the source server computing device to the destination server computing device on behalf of the directing client computing device, without first transferring the data to the directing client computing device when the connection between the source server computing device and the destination server computing device is ranked higher than the connection between the directing client computing device and the source server computing device and the directing client computing device and the destination server computing device; and
  receiving from the source server computing device information specifying progress of the transfer of the data.

19. The method of claim 18, further comprising determining whether the source server computing device supports a protocol for directed transfer of the data from the source server computing device to the destination server computing device on behalf of the directing client computing device.

* * * * *